July 22, 1924.
A. J. SMITH
TONGS
Filed Feb. 27, 1922
1,502,356
2 Sheets-Sheet 1
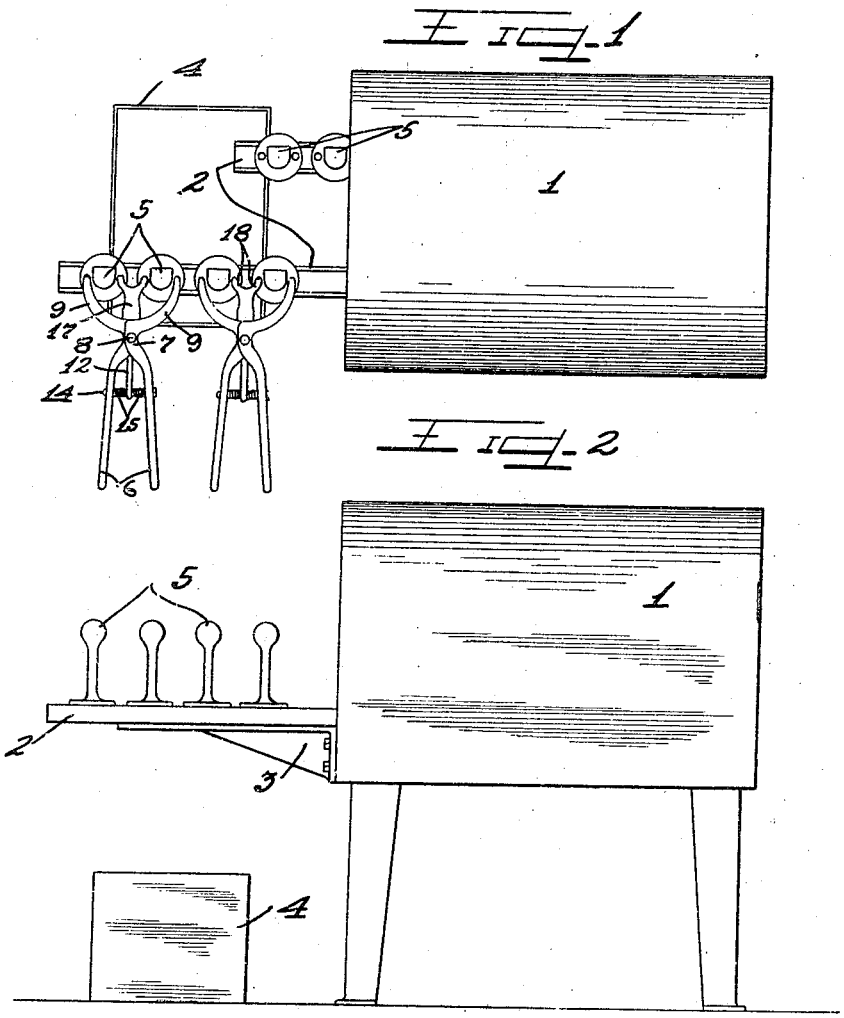
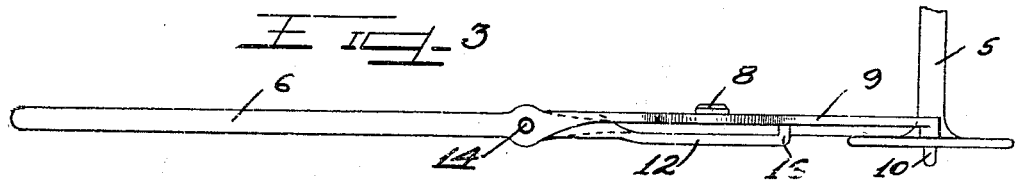
Witnesses
Inventor
August J. Smith
by

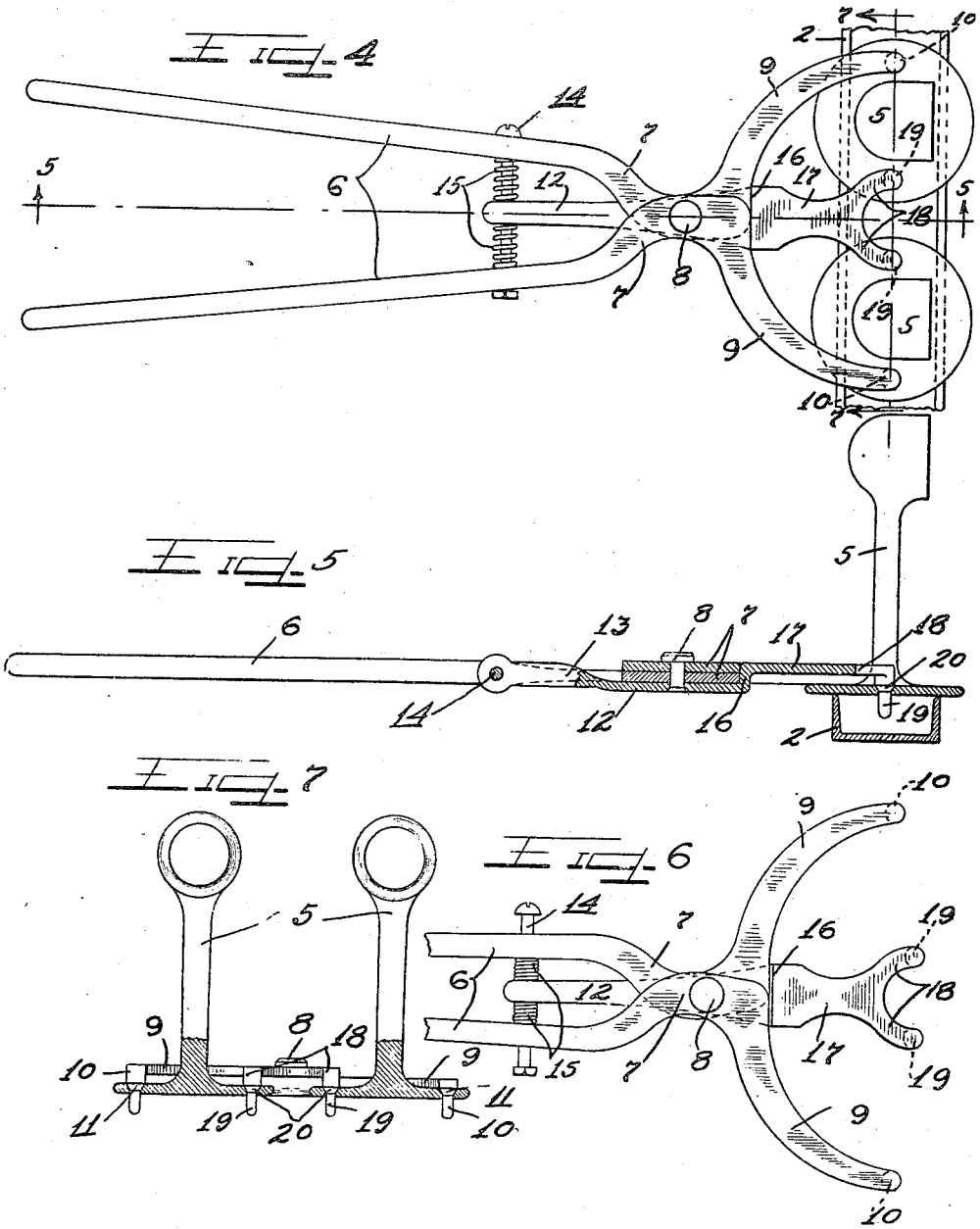

Patented July 22, 1924.

1,502,356

UNITED STATES PATENT OFFICE.

AUGUST J. SMITH, OF CHICAGO, ILLINOIS.

TONGS.

Application filed February 27, 1922. Serial No. 539,795.

*To all whom it may concern:*

Be it known that I, AUGUST J. SMITH, a citizen of the United States, and a resident of the city of Chicago, in the county of Cook and State of Illinois, have invented certain new and useful Improvements in Tongs; and I do hereby declare that the following is a full, clear, and exact description of the same, reference being had to the accompanying drawings, and to the numerals of reference marked thereon, which form a part of this specification.

In enameling metal articles such as towel rail supports and other fixtures having apertured plate supports, considerable difficulty is encountered in handling the heated metal articles to permit the same to be dipped in liquid enamel, sprinkled with powdered enamel or dipped in powdered enamel so that powder will adhere to all of the surfaces of the articles and be fused thereon without clogging up the screw openings.

This invention relates more particularly to improved tongs for handling heated apertured metal articles which are adapted to have headed pins on the tong jaws inserted into the apertures in the plate supports of the articles to plug the apertures during a dipping process to prevent fused enamel from filling up said apertures.

It is an object of this invention to provide an improved tong whereby a plurality of heated apertured articles may be handled at the same time.

It is also an object of the invention to provide tongs whereby a plurality of apertured heated articles to be enameled may be handled by means of pins on the clamping jaws to permit the articles to be dipped without allowing the apertures to become clogged up.

Another object of the invention is the construction of tongs having an intermediate jaw member adapted to coact with a plurality of outer clamping jaws formed on spring controlled handle members.

It is furthermore an object of this invention to provide tongs wherein a spring controlled pivoted member is provided with a plurality of gripping members adapted to co-act with a plurality of main gripping members operable by handle members controlled by the springs governing the pivoted intermediate member.

It is an important object of this invention to provide a simple and effective one hand tool whereby a plurality of apertured articles may be engaged and clamped to permit said articles to be handled with ease and dipped to coat all surfaces thereof with the exception of the surfaces forming the apertures.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of a heating and enamel baking machine showing a plurality of tongs embodying the principles of this invention engaged with a plurality of apertured articles to be handled.

Figure 2 is a side elevation thereof with the tongs omitted.

Figure 3 is a side view of a pair of tongs engaged with the apertured base plate of an article.

Figure 4 is a top plan view of the tongs engaging a plurality of apertured articles to be handled.

Figure 5 is a section taken on line 5—5 of Figure 4.

Figure 6 is a fragmentary top plan view of the tongs showing the handles compressed and the main jaws extended.

Figure 7 is a sectional view taken on line 7—7 of Figure 4.

As shown on the drawings:

The reference numeral 1 indicates a heating and enamel baking oven or furnace having slidable channel rails or bars 2 which, when in projected position, are adapted to be supported on brackets or shelves 3. A box 4 containing a fusible enameling powder is positioned beneath the brackets 3 in an accessible position. The slidable rails are adapted to have a plurality of articles such as metal towel rail supports 5 and the like to be placed upon the slidable rails 2 with the apertured base plates of said articles resting on said rails, as illustrated in Figures 1 and 2. When a rail has a plurality of artices 5 placed thereon, the rail is pushed into the furnace to permit the articles to be heated. After the articles have been sufficiently heated the rail is pulled out to permit the articles to be engaged by the improved tongs.

The improved tongs of this invention comprises a pair of long handles 6 deflected at 7. The deflected portions 7 of the handles 6 are pivotally connected one to the other by a pivot pin 8. Integrally formed on the deflected portion 7 of each handle is an outwardly curved clamping arm or jaw 9 on the end of which a gripping pin 10 is integrally formed at right angles. The gripping pin is provided with a beveled portion 11 intermediate an enlarged head portion and a reduced shank portion.

Also pivoted on the pin 8 is a lever 12 deflected at 13 to position the inner apertured end thereof in the plane of the handles 6. Projecting through apertures in the handles 6 and through the aperture in the end of the lever 12 is a bolt 14 having two coiled springs 15 engaged therearound between the handles 6 and the lever 12. The lever 12 is deflected to afford a shoulder 16 which serves to hold the arm 17 of said lever disposed in the plane of the handles 6. Integrally formed on the outer end of the lever arm 17 is a yoke embracing a pair of clamping arms or jaws 18 on the end of each of which a gripping pin 19 is integrally formed at right angles. Each pin 19 is provided with a beveled portion 20 intermediate an enlarged head portion and a reduced shank portion.

The operation is as follows:

While the tool or tongs herein described and illustrated may be adapted for a number of different purposes, the tongs are particularly adaptable for use in handling heated metal articles to be enameled and having base plates provided with apertures for receiving mounting screws. The type of articles herein illustrated are rail or rod holders 5 provided with base plates having openings or apertures therein.

Figure 1 illustrates a heating or baking furnace having one of the slidable rails 2 pulled out of the furnace to afford access to a number of rail holders 5 which have been heated in the furnace. Each pair of tongs is adapted to handle two rail holders at a time. Normally the coiled springs 15 act to hold the handles 6 projected outwardly away from one another, as shown in Figure 4. The tongs are operable by one hand, thereby permitting a person to conveniently use two tongs at a time. With the heated rail holders 5 positioned as shown in Figures 1 and 4, each pair of tongs is taken hold of by the handles 6 and the shank ends of the gripping pins 10 and 18 are projected through the apertures in the base plates of two adjacently positioned rail holders, as illustrated in Figures 4 and 5, so that the beveled portions 11 and 20 of the pins 10 and 19 will seat upon reamed or countersunk surfaces of the base plate apertures. The pins thus plug up the base plate apertures. Each pair of tongs is adapted to engage two rail holders. When the handles 6 are in extended position each pair of the tong pins 10 and 19 are spaced a predetermined distance apart to permit them to be projected through the opposite apertures in each rail holder base plate. With the tongs engaged with the heated rail holders 5 the handles 6 are forced toward one another thereby compressing the springs 15, as shown in Figure 6. The inward movement of the handles acts to move the jaws 9 outwardly away from one another thereby causing the pins 10 and 19 to tightly grip the base plates. The rail holders 5 may now be lifted from the slide rail 2 and dipped in the enameling powder in the box 4. The heated condition of the rail holders causes the powder to adhere to the surfaces of the holders and fuse thereon. The rail holders are then again placed upon the furnace rail 2, after which the handles 6 of each pair of tongs are released whereby the springs 15 act to throw the same outwardly back into normal or released position. The gripping pins 10 and 19 are next withdrawn from the base plate apertures and the furnace rail 2 is pushed back into the furnace 1 to permit the fused enamel to be baked upon the rail holders. The gripping pins 10 and 19 act as plugs for the base plate apertures and prevent any of the enameling powder from entering said apertures. It will thus be seen that when the rail holders have been properly dipped and baked that the base plate apertures will be free from enamel and will receive retaining screws when the rail holders are to be mounted in place. By using two pair of tongs, one in each hand, an operator may handle four rail holders at a time.

When the tong handles 6 are released from the position illustrated in Figure 6 the inward movement of the jaws 9 is limited by the stop shoulder 16 which forms a part of the intermediate lever 12—17. The tong pins 10 and 19 are thus held a predetermined distance apart.

I am aware that numerous details of construction may be varied through a wide range without departing from the principles of this invention, and I therefore do not purpose limiting the patent granted otherwise than necessitated by the prior art.

I claim as my invention:

1. A pair of tongs comprising a pair of pivotally connected handles, a jaw integrally formed on each handle, a pin formed on each jaw, a pivoted lever connected with said handles, a plurality of jaws formed on said lever, pins on said lever jaws, a bolt projecting through said handles and through said lever, and springs on said bolt between said lever and said handles.

2. Tongs comprising three pivotally mounted clamping members disposed in substantially the same plane, and gripping pins formed on each of said members.

3. Tongs comprising three pivotally connected clamping members, pins thereon, slidable means connecting said members beyond the pivot points thereof, and springs on said slidable means between said members.

4. Tongs comprising a pair of clamping members, an intermediate clamping member, a pivot pin connecting all of said clamping members, and resilient means between said intermediate clamping member and said pair of clamping members.

5. Tongs comprising a plurality of clamping members, and gripping pins formed thereon in planes at right angles to the planes of said clamping members and having beveled intermediate portions.

6. Tongs comprising a plurality of pivotally connected main and intermediate clamping members, gripping pins formed at right angles on the ends thereof, means connecting said main and intermediate clamping members, and springs on said means separating said main and intermediate clamping members.

7. Tongs comprising a pair of handles, offset portions integral therewith, jaws integral with said offset portions, a pivot pin connecting said offset portions of said handles, pins formed on the ends of said jaws, a lever engaged on said pivot pin, a stop formed on said lever for limiting the inward throw of said jaws, a plurality of jaws formed on said lever, pins formed thereon, a bolt slidably projecting through said handles and through said lever, and springs on said bolt on opposite sides of said lever for holding the handles projected against the ends of said bolt.

8. Tongs comprising a pair of spring controlled handles pivoted to one another, clamping jaws on said handles, a lever pivoted to said handles, clamping jaws thereon disposed between the handle clamping jaws, and pins formed on said handle clamping jaws and on said lever clamping jaws adapted to be inserted through apertures in a plurality of articles to be simultaneously clamped and held by said tongs.

In testimony whereof I have hereunto subscribed my name in the presence of two subscribing witnesses.

AUGUST J. SMITH.

Witnesses:
FRED E. PAESLER,
JAMES M. O'BRIEN.